Figure 1:
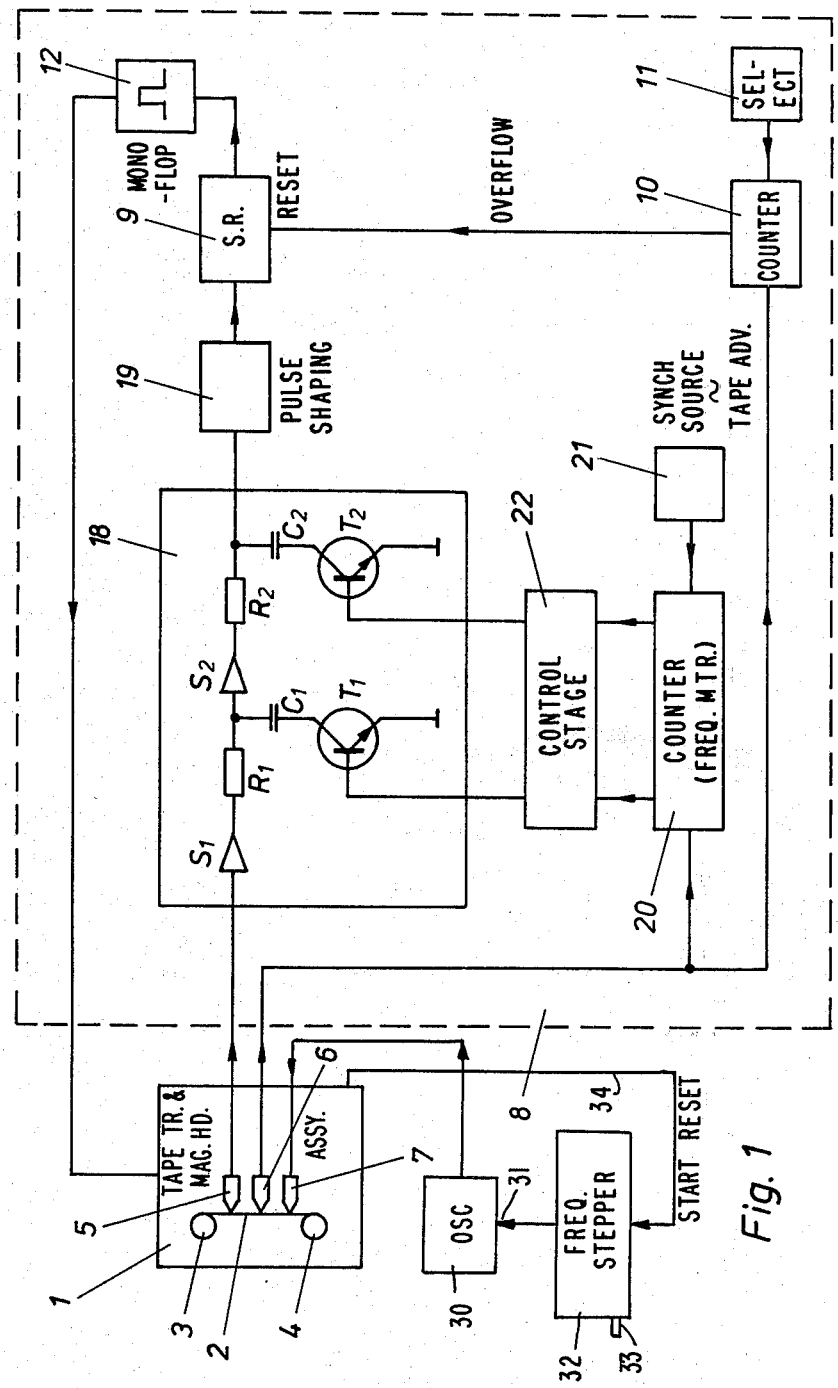

United States Patent [19]
Hansen et al.

[11] 4,316,224
[45] Feb. 16, 1982

[54] MAGNETIC TAPE REPRODUCER-RECORDER WITH MEANS FOR TAPE SEGMENT IDENTIFYING AND LOCATING

[75] Inventors: Jens Hansen; Thomas Schäfer, both of Hildesheim, Fed. Rep. of Germany

[73] Assignee: Blaupunkt-Werke GmbH, Hildesheim, Fed. Rep. of Germany

[21] Appl. No.: 59,661

[22] Filed: Jul. 23, 1979

[30] Foreign Application Priority Data

Jul. 22, 1978 [DE] Fed. Rep. of Germany ....... 2832337

[51] Int. Cl.³ .................... G11B 5/02; G11B 27/32; H04N 5/795
[52] U.S. Cl. ........................ 360/72.2; 360/14
[58] Field of Search .................. 360/72.2, 14, 18–19, 360/35, 10, 72.1, 74.4, 74.1, 49; 179/100.1 PS; 369/32–33, 41, 50

[56] References Cited

U.S. PATENT DOCUMENTS

| | | | |
|---|---|---|---|
| 2,396,409 | 3/1946 | Berzer | 360/72.2 |
| 2,782,262 | 2/1957 | Hammond, Jr. et al. | 360/74.4 |
| 3,732,364 | 5/1973 | Terada | 360/49 |
| 3,761,611 | 9/1973 | Nakamura | 360/35 |
| 3,851,116 | 11/1974 | Cannon | 360/49 |
| 3,879,752 | 4/1975 | Heidecker | 360/49 |
| 3,890,639 | 6/1975 | O'Donnell et al. | 360/14 |
| 3,925,815 | 12/1975 | Lemelson | 360/14 |
| 4,000,518 | 12/1976 | Stearns | 360/74.4 |
| 4,065,794 | 12/1977 | Shutterly | 360/72.1 |
| 4,139,869 | 2/1979 | Holt | 360/72.2 |
| 4,167,028 | 9/1979 | Tobey | 360/72.2 |

FOREIGN PATENT DOCUMENTS

| | | | |
|---|---|---|---|
| 2017108 | 10/1971 | Fed. Rep. of Germany | 360/49 |
| 810111 | 3/1959 | United Kingdom | 360/72.2 |

*Primary Examiner*—Raymond F. Cardillo, Jr.
*Attorney, Agent, or Firm*—Frishauf, Holtz, Goodman & Woodward

[57] ABSTRACT

Tape segment identifying signals in a frequency range below the lower threshold of sound signals that can be recorded or played back from the tape are recorded on the sound track of a video tape, a characteristic such as the frequency, pulse length, or phase of the identifying signals being changed stepwise as successive tape segments corresponding to successive scenes or successive periods of playing time are recorded. To find a selected segment for playback, beginning when the tape is in any position in the machine, the tape transport mechanism is put into the fast-forward or reverse mode, the identifying signals are filtered by a low-pass filter having a cutoff frequency dependent upon tape speed and then are passed through a pulse-shaping circuit to produce square waves, after which the frequency, pulse length or phase is digitally measured and compared with a selected value representing the segment to be found, using synchronizing pulses, such as the vertical synchronizing pulses of a television signal, as reference signals.

The detection circuit is so coordinated with the direction of tape transport as to produce a "match" signal at the beginning of the tape segment selected, which signal puts the equipment in readiness for playback.

2 Claims, 2 Drawing Figures

MAGNETIC TAPE REPRODUCER-RECORDER WITH MEANS FOR TAPE SEGMENT IDENTIFYING AND LOCATING

This invention concerns tape recorder-reproducer apparatus for information signals, particularly for television signals, equipped with fast forward and reverse tape transport means as well as means for tape transport at a slower recording and playback velocity, and, particularly, having arrangements for identifying distinctively various segments of the tape relating to different subjects or cenes and for selecting a tape segment to be played back and automatically finding it.

The conventional way of finding a portion of a tape recording for playback is to start the tape at the beginning and to use the fast forward tansport mode until a counter of the device showing how much tape has passed gives a reading corresponding to the expected location of the segment to be found. Instead of a mechanical counter, there may be counting marks recorded on the tape, so that positions on the tape can be found by operating an electronic counter in the machine.

These methods have the disadvantage that it is always necessary to wind the tape to the beginning point to find the counted out address, the operation of winding of the tape to the beginning point consuming an annoying amount of time.

It is an object of the present invention to provide apparatus of the kind mentioned above which makes possible a quick location of the desired tape segment for playback thereof without requiring the tape to be returned to the beginning point in order to locate the desired segment.

SUMMARY OF THE INVENTION

Briefly, additional signals are recorded for identifying tape segments in such a manner that slow or recording and playback velocity of tape transport the segment identifying signals have a frequency spectrum below the frequency range of the information signals to be played back, which in the usual case means in the subaudible range or below the audio frequency cut-off of the sound channel in the case of a television recording. A characteristic of the identifying signals is changed from segment to segment. For example, the frequency although constant for each segment, may change from segment to segment, preferably always in the same sense. Alternatively, the frequency may be unchanged for the entire tape, but the pulse length of the recorded identifying signals, although constant for any particular segment, is changed from segment to segment, again preferably increasing steadily from one end of the tape to the other (i.e. from beginning to end or from end to beginning). Another possibility is that the phase of identifying signals that are always of the same frequency may be changed from segment to segment.

The tape segment identifying signals, which may be recorded on the sound track in the case of a television signal or on a special track in any case are picked up by a magnetic pick-up head during fast forward and reverse transport of the record tape and induce in that pick up head operating voltages that can be evaluated to find a previously selected tape segment by a process of signal comparison, the selection being made by a selecting device, i.e., by turning a knob or keying in information from a keyboard or push button array, etc. to store (i.e. set up) the particular standard of comparison with the picked up identifying signals. Advantageous implementation of this invention is provided when the alternating voltages induced in the aforesaid pick-up head and corresponding to the recorded identifying signals are evaluated by supplying them to a switching stage in which a selectable standard of comparison is stored as above mentioned which may be regarded as programing a switching stage for finding a selected tape segment, while the tape transport is operated at high velocity first in one direction and then in the other, if necessary, beginning wherever it happens to be at the start, with the switching stage being so organized that as soon as the identifying signals corresponding to the selected tape segment begin to be received, the switching stage interrupts the high velocity tape transport and, preferably, immediately puts the equipment into playback operation at the playback transport speed.

In a particular development of the invention a reliable location of the selected tape segment is obtainable with simple means by coding the identifying signals in their frequency, so that successive segments of the tape have identifying signals of progressively increasing frequency, the identifying signal of each segment forming a continuous wave with a frequency designating the particular segment. The alternating voltages induced in the identifying signal pick-up head are preferably evaluated by supplying these alternating voltages to a resettable shift register to which the overflow pulses of a counter which the overflow level can be set to select a tape segment, are supplied to the shift register as resetting pulses, the counter being supplied at its counting input with synchronizing or clock pulses of a frequency above the frequency range of the picked-up identifying signals. As the selected tape segment passes by the identifying signal pick-up head at the high tape transport speed, an interruption of the high speed transport of the tape is produced by supplying the output pulses of the shift register to a monoflop circuit (i.e. a monostable circuit that can be triggered to produce a rectangular pulse of a predetermined duration, after which it returns to its stable state). The time constant of the monoflop in such a case is greater than the time interval between two successive output pulses of the shift register and the two (direct and inverse) outputs of the monoflop are coordinated with the fast forward and reverse transport of the tape (which is to say that one output is chosen for fast forward operation and the other for reverse operation). Then, when the start end of the selected tape segment reaches the identifying signal pick-up head, a voltage jump occurs at the output of the monoflop and this voltage jump is utilized (by means of a suitable relay or equivalent semiconductive circuit) to interrupt the fast forward or reverse transport of the tape, this being the final operation of the switching stage used in the present invention.

According to another aspect of the invention, location of the selected tape segment is obtained by coding the identifying signals in pulse length, while keeping the frequency constant. In this case, the pulse length of the identifying signals remains constant for each particular segment and, preferably, the pulse length is progressively increased from one end of the tape to the other (from beginning to end or vice versa). The voltages induced in the pick-up head for the identifying signals are preferably evaluated in this case by measuring the pulse length of the picked-up identifying signals by means of a resettable counter to which the identifying signals are supplied. The counter is connected to be reset by a resettable shift register to which are supplied synchronizing signals indicative of the advance of the tape which have a frequency lying above the constant frequency of the identifying signals. The shift register is reset by the alternating voltages present at the input of the counter, and the output pulses of the shift register are also used to transfer the count state of the counter into a buffer store, the content of which is compared with a comparison number set by a tape segment selecting device in order to produce a switching output for the tape transport. Thus, the tape record can be moved rapidly forward and back until the beginning of the selected tape segment is found, when the tape transport will be switched over into the playback direction and speed, while the playback conditions are at the same time set up in the machine.

A similar evaluation can be made where the signals are coded in phase, rather than pulse length, by operating a standard phase oscillator of the identifying signal frequency in synchronism with counted-down signals of the train of synchronizing signals indicative of tape speed. The phase comparison then involves an interval measurement which can be evaluated in the same manner as pulse length.

Disturbance of the playback operation by the additional identifying signals is prevented in accordance with a further development of the invention by utilizing identifying signals substantially free of overtones, thus for example sinusoidal signals.

According to a further development of the invention, disturbance of the evaluation of the identifying signals by the information recorded for playback is avoided by interposing a low-pass filter in the output of the pick-up head in which alternating voltages are induced by the identifying signals during fast forward or reverse transport of the tape, the filtered identifying signals being obtained from the output of the low-pass filter for evaluation. The cut-off frequency of the low-pass filter is arranged to be variable in dependence on the transport velocity of the tape, so that recorded signals of a frequency above the frequency range of the identifying signals are blocked by the low-pass filter.

Reliable evaluation of the identifying signals, by the resettable shift register in one of the above described embodiments and by the resettable counter in the other, is improved by providing a pulse shaping stage ahead of the shift register, or the counter, as the case may be, to tansform the picked up identifying signals into rectangular pulses.

When the recorder-reproducer apparatus is designed for television recordings, the desired synchronizing pulses corresponding to the advance of the tape can conveniently be obtained from the picture field change pulses, which is to say from the vertical synchronizing pulses recorded on the tape.

The advantages of the present invention are particularly to be found in that the identifying signals related to the individual tape segments can easily be recorded directly on the sound track of a video tape record during the recording of a television signal, or directly on the information track in the case of a sound recording, without any risk of interfering with the sound playback because they lie well below the sound frequency range utilized during the playback operation and thus produce no appreciable alternating current in the magnetic heads used for recording and playback of the information stored on tape. The invention lends itself to utilization in information recording and playback apparatus of all kinds for use with magnetic records without any substantial additional expense.

Figure 2:
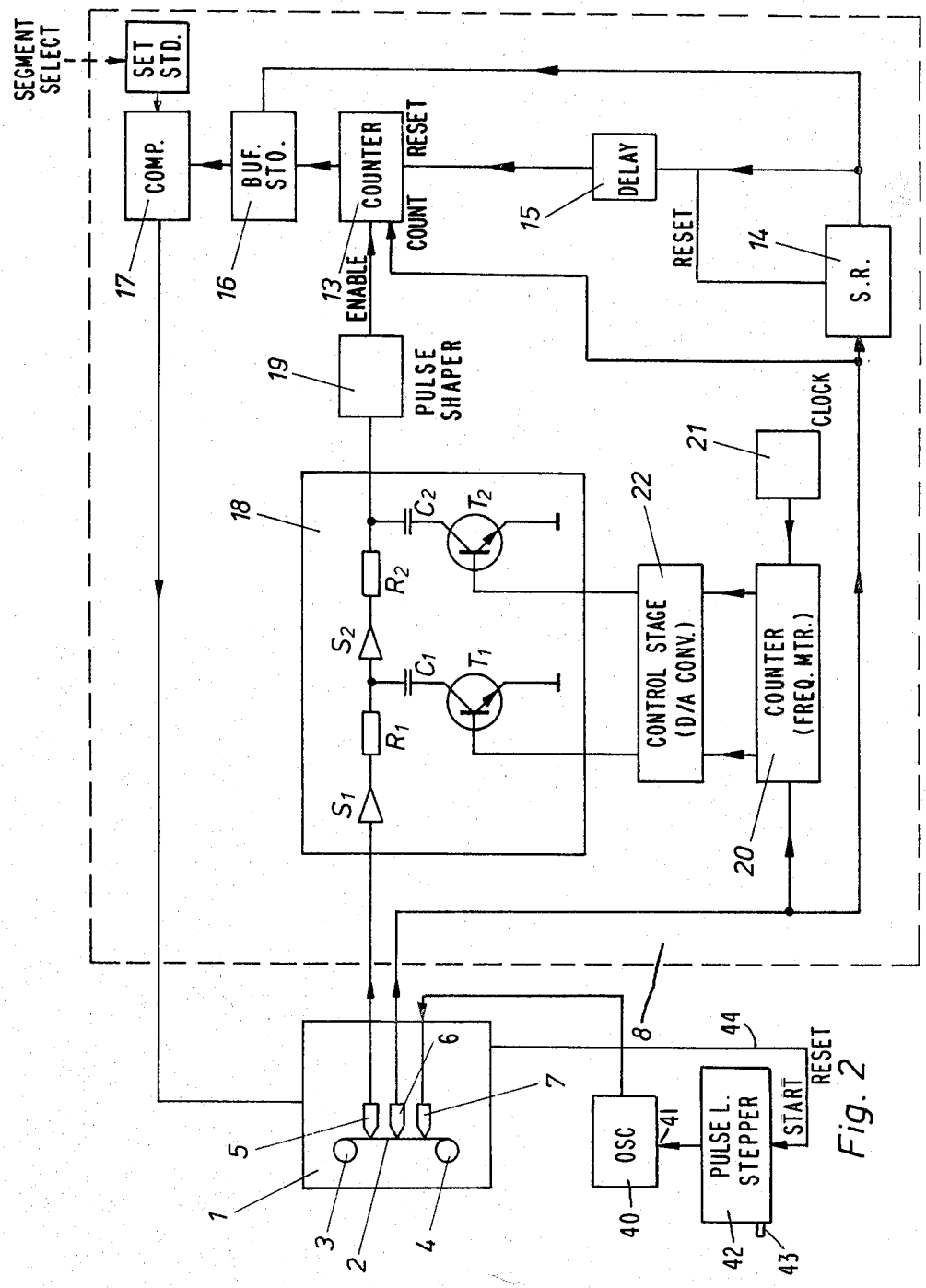

The invention is further described by way of illustrative examples with reference to the annexed drawings, in which:

FIG. 1 is a block diagram of the relevant portion of a video tape recording and playback apparatus embodying the invention utilizing a frequency coding of the tape segment identifying signals, and FIG. 2 is a block diagram of a video tape recording and reproducing apparatus embodying the invention and utilizing pulse-length coded identifying signals.

As shown in FIG. 1, in a magnetic head and tape transport assembly 1 of a recorder-reproducer apparatus, a magnetic record tape 2 is moved between the reels 3 and 4 past a number of magnetic heads of which only three are shown in order to simplify the illustration.

The magnetic head 5 serves for picking up the tape segment identifying signals during fast forward or reverse movement of the tape 2. The magnetic head 6 is for picking up synchronizing signals as further described below and the head 7 is used for recording the tape segment identifying signals. The pick-up and recording heads for the video signals and soundtrack are not particularly shown in order to simplify the illustration, but it should be understood that the 6 and 7 could also serve for picking up and recording the soundtrack of a television signal working into and out of connections and apparatus not shown in the drawing.

As previously explained, the various scenes or subjects occupying their several segments on the tape are identified by characteristic identifying signals. At the time of recording, the identifying signal characteristic is advanced to the next step with every change of scene or subject, which can easily be provided for by a manual pushbutton, for instance, operated at the time of recording, the circuits for providing the stepping up or down of frequency, of pulse length, or phase shift, being so well known as not to require any further description. The various scenes, or certain ones at reasonable intervals, can be logged after the recording is made, so that thereafter any part of the recording can readily be addressed by picking the suitable code and setting it in as further described below.

FIG. 1 shows the oscilator 30 which generates sinusoidal waves of variable frequency, the frequency being determined by the frequency setting input 31 to which a control voltage is applied. The oscilator 30 is put in operation, by means not shown, only when the tape recorder-reproducer is used in the recording mode. Its frequency range is below the lower audio frequency threshold of the sound track of the illustrated apparatus for recording and reproducing television signals. The circuit 32 provides a steady control voltage for maintaining the frequency of the output of the oscilator 31 constant during each tape segment that is recorded and this control voltage can be stepped up by a predetermined increment, with the beginning of each new tape segment to be identified, by operating the push button 33 which activates a stepping circuit of a form so well known that it does not need to be illustrated. A mechanical stepping device operating a voltage setting potentiometer, or the like, could also be used. The reset connection 34 serves to return the stepping device 32 to the state that corresponds to the beginning of a new tape, in response to means not shown in the tape head and transport assembly 1 which are set in operation by either a manual identification start button or an automatic activation tripped by the rewinding of the tape fully into its original supply reel.

The identifying signals picked up by the pick-up head 5 are fed through a low pass filter 18 that blocks out any signal components lying above the frequency range of the identifying signals. The cutoff frequency of the low pass filter 18 is accordingly variable in dependence upon the transport velocity of the tape 2. For that purpose synchronizing pulses from a time base generator 21 that are proportional in repetition rate to the transport velocity of the recording tape 2 are counted by a counter 20 operating as a frequency meter. The counter 20 modifies the conductivity of the transistors T-1 and T-2 of the low pass filter 18, doing so through the control stage 22 which is a digital-to-analog conversion stage. In so doing the cutoff frequency of the low pass filter 18 is so modified that, independently of the tape transport velocity of the time, the identifying signals can always pass through the low pass filter 18 while the signal components lying above the frequency range of the identifying signals are blocked by the low pass filter 18. The low pass filter consists of resistances R-1 and R-2, capacitors C-1 and C-2, transistors T-1 and T-2 as well as decupling devices S-1 and S-2, which decuple the individual low pass sections of the composite low pass filter 18 and form impedance convertors. The individual low pass sections respectively consist of the elements R-1, C-1 and T-1 and R-2, C-2 and T-2. By constituting the low pass filter 18 of a plurality of elementary low pass sections, a high flank steepness of the filter characteristic is obtained in the neighborhood of the cutoff frequency.

As already mentioned, the vertical synchronizing pulses of a recorded video signal, picked up the magnetic pick-up head 6 can, for example, be utilized as the synchronizing pulses, since these pulses will naturally be inherently proportional in their frequency to the transport velocity of the tape 2.

The output signals of the low pass filter 18 are reshaped into substantially rectangular signals by the pulse shaping stage 19, that is, for example, constituted as a Schmitt trigger circuit, for example, for better signal proceesing in later stages.

The frequency coded identifying signals as they appear as output voltages of the pulse shaping stage 19 are supplied, as shown in FIG. 1, by the latter stage to the resettable shift register 9. The overflow pulses from the counter 10, the overflow level of which is set by the tape segment selecting unit 11, which preferably has a manual setting contral (not shown), are supplied as resetting pulses to the shift register 9. The synchronizing pulses related to the transport velocity of the tape 2, which occupy a frequency region above the frequency range of the identifying signals, are supplied to the counting input of the counter 10, the overflow level of which has been selected as aforesaid.

The output pulses of the shift register 9 are fed to the monoflop 12, with care being exercised to be sure that the time constant of the monoflop 12 is greater than the time interval between successive output pulses of the shift register 9. The two output voltages of the monoflop 12 are correlated respectively to the fast forward and reverse transport of the tape 2, so that upon the beginning of the selected tape segment, a voltage jump appears at the output of the monoflop 12. This voltage jump is utilized, by means not shown, to produce interruption of the fast forward or reverse motion of the tape 2 by the switching stage 8. For the simplest mode of operation of the switching stage 8, it is necessary that successive segments of the tape recording should be correlated with a succession of steps in frequency progressively increasing along the tape, or decreasing if preferred, from the beginning to the end of the recording.

The two output voltages of the monoflop 12 are utilized to correspond respectively to the fast forward and fast fast reverse modes of operation for automatic searching out of the segment having an identification corresponding to that set in by the selector 11. These monoflop outputs are used only in fast forward, fast reverse and stop positions of the tape transport mode selector switch (not shown). If the tape record happens to be in a position such that the tape segment which is selected for playback has not yet been reached, a constant voltage then accordingly appears at the output of the monoflop 12 which puts into operation the fast forward transport of the tape 2. If on the other hand, the tape position is such that the tape segment which it is desired to select for playback at the pick-up heads or has already passed through them, the other constant voltage appears at the output of the monoflop 12, which is such as to put the tape transport into the fast reverse operation.

When the beginning of the selected tape segment is reached at the magnetic head 5 that picks up the identifying signals, a voltage jump occurs at the output of the monoflop 12, by which jump an interruption of the fast forward or fast reverse mode of operation of the tape transport 2 is produced, so that the recorder-reproducer is made ready to be switched into the playback mode of operation. If desired, when the fast forward or fast reverse operation is interrupted, the switching in of the playback mode of operation can be produced at once without waiting for a further manual command.

In the above described manner a rapid location of the selected tape segment can be obtained regardless of what portion of the tape is at the magnetic heads at the time the search operation is begun.

FIG. 2 shows a block diagram of a tape recording and reproducing apparatus for television signals showing the invention in the form in which the tape segment identifying signals are coded in pulse length. In this case, the oscilator 40 is an oscillator of constant frequency providing a more or less square wave output. The pulse length is controlled through a pulse length modulating input 41 by a control voltage supplied by the stepping unit 42. Pulse length modulated square wave oscilators are well known and need not be further described here. Since the pulse length stepping device 42 provides simply a control voltage, it can be constituted in the same way as the frequency stepping device 32 of FIG. 1 that likewise provides a control voltage and it is similarly equipped with a stepping button 43 and a start reset connection 44.

The signals picked up by the identifying signal pick up head 5 are, again, passed through a low pass filter 18 of a variable cutoff frequency controlled by the stages 20, 21 and 22 for varying the cutoff frequency with the tape transport speed and, likewise, the filtered identifying signals are then passed through a pulse shaping stage 19 to provide a square wave output. This pulse shaping stage may be necessary even when the identifying signals are recorded as more or less square waves because of the filtering out of the higher harmonics by the filter 18. To reduce the harmonic content of the identifying, the oscilator 40 could be constituted as a sinusoidal wave generator, in which case pulse length modulation within a certain range could be produced by variably clipping the sinusoidal wave with a variable DC threshold voltage, leaving the positive peaks of the clipped sinusoid still unclipped, but even this procedure would leave some considerable harmonic content.

The square wave output of the pulse shaping stage 19 in FIG. 2 are measured in pulse length by the resettable counter 13 to which these waves are fed. The counter 13 is arranged to be reset by the resettable shift register 14, which also provides its output pulses to a buffer store 16 for causing the transfer of the count state of the counter 13 into the buffer store with each output pulse of the shift register 14.

In order to prevent the erasing of the completed count in the counter 13 before its transfer into the buffer store 16 can be accomplished, a delay circuit 15 is provided to delay the transfer of the output pulse of the shift register 14 to the reset input of the counter 13.

The shift register 14 is arranged to be reset by its own output pulse. The input signals for the shift register 14 are synchronizing or clock pulses proportional to the advance of the tape 2 as the various magnetic heads 5, 6 and 7, which pulses are picked up by the head 6. The repitition rate of these synchronizing pulses lies above the constant frequency of the identifying signals and such side-bands as it may have as a result of pulse shaping to the extent of the latter are not negligable in power level.

The output of the pulse shaping circuit 19 is furnished to an enable input of the counter 13 and the synchronizing pulses are provided to the count input of the counter 13 so that the counter will measure the length of the pulses provided by the circuit 19. The length (number of cells) in the shift register 14 is so dimensioned that even for the longest identifying signal pulse provided by the pulse shaping circuit 19, the shift register does not provide an output pulse until the counting period of the counter 13 has been completed and then will provide an output pulse in the interval between tape segment identifying pulses, which output pulse as already mentioned, will first transfer the count to the buffer store 16 and then after the delay provided by the circuit 15, will reset the counter 13.

The content of the buffer store 16 at anytime is then furnished for a comparison, in the circuit, 17, with the set count of the storage device 17a that is set by a suitable tape segment selecting control, in such a way that, as the tape 2, in fast forward or fast reverse operation, brings the beginning of the tape segment selected for playback to the identifying signal pick-up head 5 and hence also to the video and sound track pick-up heads, not shown, the fast transport of the tape is interrupted and the tape transport and pick-up assembly 1 is put into a state in which it is ready to begin playback.

In the case of phase coding of the tape segment identifying signals a circuit arrangement similar to FIG. 2 can be used. In this case the oscilator 40 is provided with a phase shifter at its output which is controlled by the input 41 which then functions as a phase shifter control input and the oscilator 40 has an additional output of unshifted phase which is recorded on another track and is picked up by another head and furnished to a gate interposed between the pulse shaping circuit 19 and the counter 13 in order to suppress an initial portion of the output pulses of the circuit 19, so that the counter 13 measures the length of the remaining portion of the pulse, thus acting as a phase detector.

By use of the above described embodiments of the invention it is is possible to locate the desired segment of the recording on a tape on the bases of recorded identifying signals by simply running the tape in its fast forward and/or reverse mode of transport, beginning in whatever position the tape may be, without any necessity of reeling the tape back to its beginning position in order to be able to locate the desired segment for playback or for re-recording.

The frequency of the oscilator 40, either for pulse length coding or phase coding can be synchronized by a frequency divider to which the vertical synchronizing pulses of television signals being recorded or being played back are supplied, or to which the synchronizing pulses of the generator are furnished. In the case of phase coding, the provision of an additional track for the signals not shifted in phase can be dispensed with in this case and the output of the frequency divider operating on an input of synchronizing pulses can be furnished directly to the gate circuit interposed between the pulse shaping circuit 19 and the counter 13 to enable the counter 13 to operate as a phase detector. A frequency divider operating on an input of synchronizing pulses can be used in the same way to control the mid-range frequency of the oscilator 30 of FIG. 1 if the frequency modulation is accomplished by a heterodyne method, which is to say if a heterodyne mixer stage is provided at the output of the frequency divider to supply a steppable frequency change. It is to be understood that such a frequency divider and frequency shifting mixer could be used in FIG. 1 instead of the oscilator 30.

During playback the identifying signals do not disturb the playback operation but of course, as mentioned before, the identifying signals during such operation are below the sound frequency range of the sound playback equipment. In fast forward and fast reverse operation, the identifying signals then are within or above the sound frequency range of the device, as determined by the increase in the tape transport velocity between the recording speed and the fast forward and fast reverse speed.

The apparatus of the invention is usable both for video tape equipment in which the vertical synchronizing pulses provide the synchronizing pulses corresponding to the tape advance through the equipment for serving as reference signals for identifying signals and also for sound recording and reproducing devices. They are particularly well suited for tape recordings having large storage capacity.

Although the invention has been illustrated with reference to particular examples, it is to be understood that variations and modifications are possible within the inventive concept. For example, the stepping device 32 or 42 could be advanced by a simple timer or tape displacement counter to change the tape segment identifying signals code after each minute of playing time, so that operation of the push-button 33 or 43 would not be necessary and the push-button could accordingly be omitted in that case.

We claim:

1. A magnetic-tape-using recorder-reproducer apparatus for information signals having means for recording and for playing back information signals at a first predetermined tape transport velocity, including means for transporting the tape at said first velocity, and also means for transporting the tape selectively in forward or reverse direction at a velocity much higher than said first velocity, and further comprising:

means for recording additional signals of an alternating current of the same constant frequency but of different pulse lengths at different tape segments for identifying different portions of said information signals respectively recorded on said tape segments in such a manner that the frequency spectrum of said additional signals is substantially entirely below the lower limit of the frequency spectrum of the playback of said information signals when said information signals are played back at said first velocity of tape transport;

means (5) for picking up the recorded additional signals during operation of said tape transporting means at said higher velocity in either direction of transport, and means including a settable count state standard (17a) for storing an indication of the pulse length of additional signals corresponding to a tape segment to be located;

means (17) for comparing additional signals picked up by said additional signal pick-up means using said count state standard (17a) as a pulse length criterion to provide a recognition signal;

switching means (8) connected to said tape transporting means for interrupting the operation of said higher velocity tape transporting means in response to said recognition signal and then putting into forward operation said first-velocity tape transporting means, said comparing means including a resettable counter (13), a resettable shift register (14) and a buffer store (16) for measuring the pulse length of said additional signals as picked up by said picking up means, said shift register (14) being connected for being advanced by synchronizing pulses of a frequency higher than any of said additional signals and corresponding, in repetition interval, to the displacement of the tape by said tape transport means, said picked up additional signals being furnished as a counting input to said counter (13) and as resetting signals to said shift register (14), the output of said shift register being furnished as resetting signals to said counter and being supplied to an input of said buffer store (16) so as to cause the latter to store the count state of said counter (13) existing immediately before resetting thereof, said comparing means being connected to compare the content of said count state standard (17a) with the content of said buffer store (16) for causing said switching means (8) to switch over the tape transport from said higher velocity tape transport means to said first velocity tape transport means.

2. Apparatus as defined in claim 1 in which a pulse shaping stage (19) is interposed ahead of the input of said resettable counter (13) to which said picked up additional signals are provided for prividing said additional signals thereto in the form of substantially rectangular pulses.

* * * * *